Aug. 20, 1957 — L. F. KURSCHNER — 2,803,067
PLUMB BOBS
Filed June 3, 1953
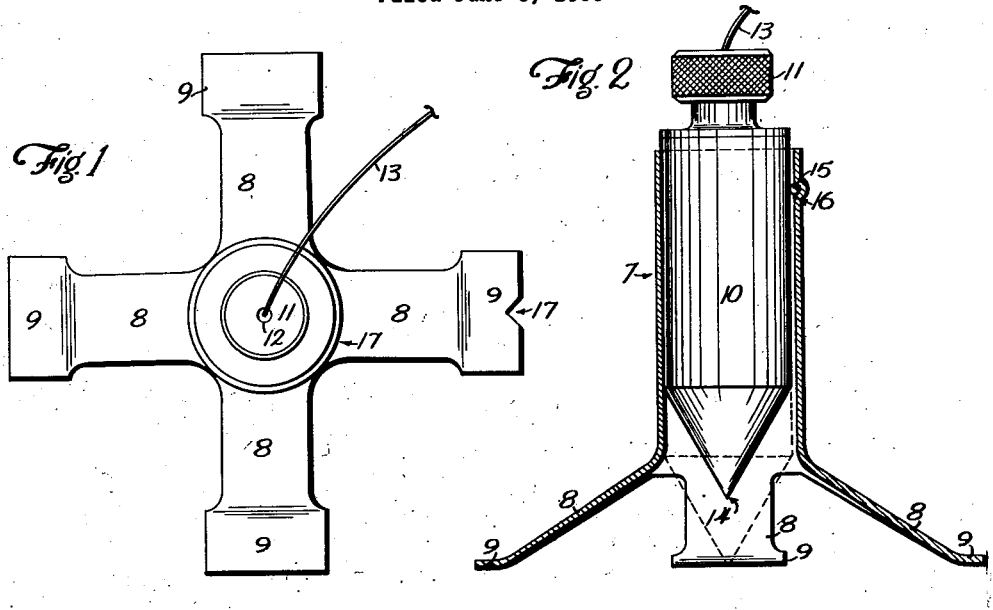
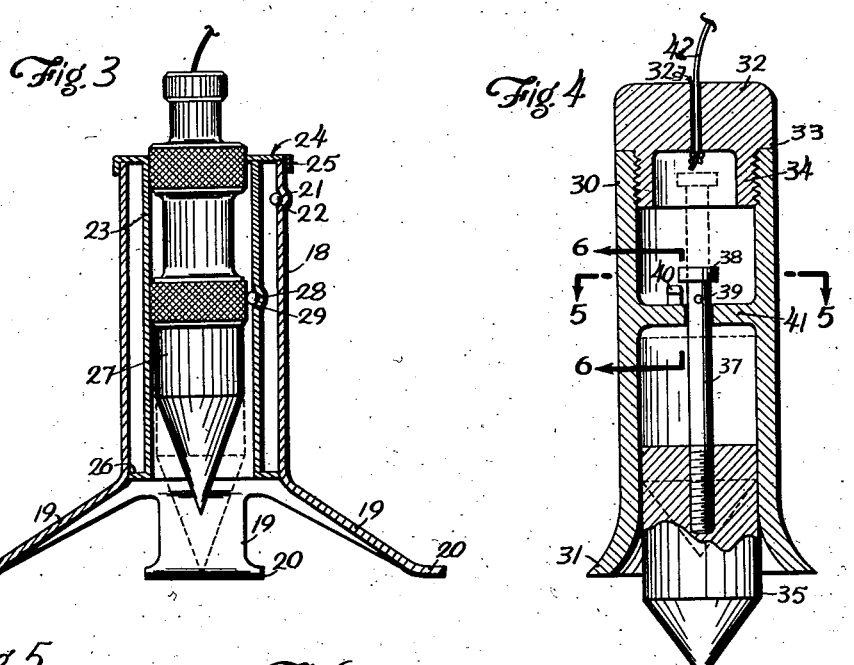
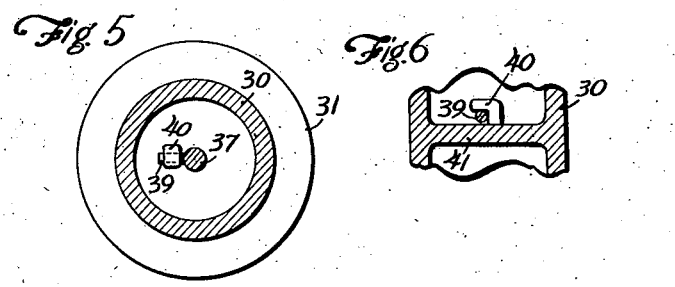
INVENTOR:
Lloyd F. Kurschner
BY: David K. Kilgore
ATTORNEY

United States Patent Office 2,803,067
Patented Aug. 20, 1957

2,803,067

PLUMB BOBS

Lloyd F. Kurschner, Minneapolis, Minn.

Application June 3, 1953, Serial No. 359,262

1 Claim. (Cl. 33—216)

My invention relates to improvements in plumb bobs.

As is well known, one of the many uses of a plumb bob is in locating a lower plumb position relative to an overhead position. For instance, in the building of a structure, a plumb bob is often used to locate the plumb position of the lower end of a stud on a shoe relative to the predetermined position of its upper end on a plate. Also in the installation of electric wiring and rough plumbing, a plumb bob is often used in locating the position of a hole to be bored in a board or a timber relative to a bored overhead hole.

In such uses, the conventional type of plumb bob actually requires two man operation as, for instance, one man on a ladder or scaffold holding the plumb line and a coworker to stabilize the bob and mark it down on the spot to be plumbed. Such procedure is obviously costly and time consuming as there is not always a coworker available and it is not generally considered good practice to drop the stabilized bob suspended on its taut line or cord, thereby rather inaccurately marking down the plumb position by denting the material at the plumbed position with the point of the bob.

By the use of my invention in combination with the conventional plumb bob, the plumbing procedure becomes a matter easily accomplished by one man wherein the position to be plumbed can be accurately located by a bob on a taut line, and thence the assembly lowered to the position below by releasing the taut line and permitting the bob to accurately drop to the plumb position and remain in that position until it is marked by the sole worker who descends to the lower position after releasing the bob or line.

The principal object of this invention is to provide novel means for holding the plumb bob in an upright position, after being released, in which it indicates a point on the member by which it is stopped.

Another object is to releasably hold the plumb bob in a raised position relative to its holding means, whereby when the holding means is dropped onto a member on which a point is to be indicated by the plumb bob, the jar or shock produced by the holding member will cause the plumb bob to move downwardly relative to its holding means until stopped by the engagement of its point with said member.

Still another object is to lock the plumb bob in a position relative to the holding means in which it can be used as a conventional plumb bob.

A further object is to provide a reducer for the holding means whereby a plumb bob of a smaller diameter may be used.

It is further important to note that in providing said reducer, it is possible for a worker to utilize the generally standardized type of cylindrical parallel sided bobs that are in general use and already in the tool kits of most workers whose line of endeavor requires the use of the plumb bob.

These and other objects will be apparent from the following description, reference being had to the drawing.

To the above end, generally stated, the invention consists of the novel devices and combination of devices hereinafter described and defined in the claim.

In the accompanying drawing, which illustrates the invention, like characters indicate like parts throughout the several views.

Referring to the drawing:

Fig. 1 is a plan view showing one embodiment of the invention;

Fig. 2 is a view of the invention shown in Fig. 1, some parts being shown in side elevation and other parts shown in central vertical section;

Fig. 3 is a view of the housing as shown in Fig. 2 containing a reducer to accommodate the housing for a plumb bob of a smaller diameter than that shown in Fig. 2;

Fig. 4 is a view partly in side elevation and partly in central vertical section showing a modification of the housing with the plumb bob in its lowermost position in which its point is materially below the base of the housing;

Fig. 5 is a detail view partly in plan and partly in section taken on the line 5—5 of Fig. 4; and Fig. 6 is a fragmentary detail view in section taken on the line 6—6 of Fig. 4.

Referring now in detail to the invention shown in Figs. 1 and 2, the numeral 7 indicates an upright cylindrical housing open at its ends. Integral with the lower end of the housing 7 are, as shown, four outwardly diverging legs 8 that afford a base for the housing 7. The legs 8 are circumferentially spaced about the housing 7 equal distances apart and the apertures between said legs permit access to the space below the housing 7. The legs 8 at their lower ends are turned outwardly to afford feet 9.

Within the housing 7 is a conventional plumb bob 10 having the customary removable cap 11 provided with an axial hole 12 through which one end of a line 13 is inserted and knotted to attach said line to the plumb bob 10. The plumb bob 10 has a free axial sliding fit with the housing 7 and is normally releasably held raised in said housing, with its point 14 above the plane of the feet 9, by a friction ball 15 held in a pocket 16 inside the housing 7.

In the outer end of one of the feet 9 is formed a V notch 17 in which the point of a pencil may be placed and the housing 7 turned about the plumb bob 10 while held as a pivot and thus a circle is scribed by the pencil about the axis of the plumb bob. This circle, for instance, would assist in positioning the lower end of a stud on a shoe.

In using the plumb bob 10, for instance, to locate the lower end of a stud on a shoe, the same is lowered with the attached housing 7 by the line 13 until it is quite close to the shoe, and then slack is placed in the line 13 to permit the plumb bob 10 and housing 7 to drop by the force of gravity. When the housing 7 is stopped by its contact of its feet 9 with the shoe, it remains in an upright position and jar or shock produced by the stopped housing 7 releases the plumb bob from the friction bail 15 and permits said plumb bob to slide downwardly in the housing 7 until stopped by the engagement of its point 14 with the shoe. While the plumb bob 10 remains held upright by the housing 7, with its point 14 resting on the shoe, the workman makes a dot on the shoe with a pencil at the plumb bob point 14.

The housing 18 shown in Fig. 3 is identical with the housing 7 and the legs, the feet, the friction ball and the pocket are designated by the numerals 19, 20, 21 and 22, respectively. Within the housing 18 is a cylindrical reducer 23 having a cover member 24 that rests on the upper end of the housing 18 and supports the reducer 23 therefrom. Integral with the cover member 24 is an annular flange 25 that caps the upper end portion of the housing 18. On the lower end of the reducer 23 is an integral annular flange 26 that contacts the inner side of the housing 18. Obviously, the flanges 25 and 26 hold the reducer 23 in axial alignment with the housing 18.

The purpose of the reducer 23 is to adapt the housing 18 for the plumb bob 27 which is of a smaller diameter than the plumb bob 10. A frictional ball 28 held in a pocket 29 in the side of the reducer 23 is provided to hold the plumb bob 27 in a raised position in said reducer.

The invention shown in Fig. 4 includes a cylindrical housing 30 having an outward flaring base 31. A screw cap 32 closes the upper end of the housing 30 and has on its upper end an annular flange 33 that engages the upper end of the housing 30 as a stop. In the under side of the cap 32 is a cavity 34.

Within the housing 30 is a plumb bob 35 tapered at its lower end portion to a sharp point 36. An upright stem or bolt 37 has its lower end portion in threaded engagement with the plumb bob 35 at its axis. This bolt 35 extends through a round hole in the center of a transverse partition 41 in the housing 30 with a loose working fit. On the upper end of the bolt 37 is a head 38.

To lock the plumb bob 35 in its lowermost position in which its pointed end 36 is materially below the base 31, a radial pin 39 fixed to the bolt 37 is interlocked with a hooklike member 40 fixed to the partition 41 by a relative turning of said bolt about its longitudinal axis. Obviously, the pin 39 engages the partition 41 as a stop to limit the projection of the plumb bob 35 and positions the pin 39 for interlocking engagement with the member 40 when the bolt 37 is turned about its longitudinal axis.

A line 42 extends through an axial hole 32ª in the cap 32 and its lower end portion is knotted within the cavity 34 to attach said line to the housing 30. The cavity 34 affords clearance for the bolt head 38 and the knot in the line 42. The radial pin 37 and the hook-like member 40 are similar to a bayonet joint. When the plumb bob 35 is held suspended, by the engagement of the pin 39 with the partition 41, its point 36 is below the lower end of the housing 30 and thus permits said plumb bob to be used as a conventional plumb bob.

The housings 7, 18 and 30 perform another important function and that is they add additional weight to the respective plumb bobs and they prevent swinging of said plumb bobs as they are lowered to indicate a point.

While there are herein disclosed but a limited number of embodiments of the structure, process and product of the invention herein presented, it is possible to produce still other embodiments without departing from the inventive concept herein disclosed, and it is desired, therefore, that only such limitations be imposed on the appended claim as are stated herein, or required by the prior art.

What I claim is:

A cylindrical housing having a plurality of supporting legs, a line-equipped plumb bob mounted in the housing for relative axial movement, and normally frictionally held in a raised position whereby, when the housing is lowered and its legs brought into contact with a support by the drop, the jar will cause the plumb bob to move downwardly in the housing and onto the support and be exposed between the legs, said legs having outwardly turned feet and one of the feet having a positioning notch whereby the housing may be moved pivotally.

References Cited in the file of this patent

UNITED STATES PATENTS

| | | |
|---|---|---|
| 870,576 | McQuaid | Nov. 12, 1907 |
| 1,178,835 | Berg | Apr. 11, 1916 |
| 1,949,652 | McLaws | Mar. 6, 1934 |
| 2,333,134 | Whitlock | Nov. 2, 1943 |